United States Patent

Menon et al.

[11] Patent Number: 5,574,882
[45] Date of Patent: Nov. 12, 1996

[54] SYSTEM AND METHOD FOR IDENTIFYING INCONSISTENT PARITY IN AN ARRAY OF STORAGE

[75] Inventors: Jaishankar M. Menon, San Jose; James C. Wyllie, Monte Sereno; Geoffrey A. Riegel, San Jose, all of Calif.

[73] Assignee: International Business Machines Corporation, Armonk, N.Y.

[21] Appl. No.: 397,817

[22] Filed: Mar. 3, 1995

[51] Int. Cl.$^6$ .......................... G06F 11/10; G06F 12/00; G06F 13/00

[52] U.S. Cl. ............... 395/441; 395/182.03; 395/182.04; 395/404

[58] Field of Search .................................. 395/438, 439, 395/441, 471, 472, 479, 481, 490, 491, 182.04, 183.18, 404

[56] References Cited

U.S. PATENT DOCUMENTS

| | | | |
|---|---|---|---|
| 4,761,785 | 8/1988 | Clark et al. | 371/51 |
| 4,849,929 | 7/1989 | Timsit | 364/900 |
| 5,088,081 | 2/1992 | Farr | 369/54 |
| 5,109,505 | 4/1992 | Kihara | 395/575 |
| 5,233,618 | 8/1993 | Glider et al. | 371/68.1 |
| 5,249,279 | 9/1993 | Schmenk et al. | 395/825 |
| 5,263,145 | 11/1993 | Brady et al. | 395/441 |
| 5,287,473 | 2/1994 | Mohan et al. | 395/460 |

(List continued on next page.)

OTHER PUBLICATIONS

F. D. Lawlor "Efficient Mass Storage Parity Recovery Mechanism", IBM Technical Disclosure Bulletin vol. 24 No. 2 (Jul. 1981), pp. 986–987.

C. Crews et al. "Method for Background Parity Update in a Redundant Array of Inexpensive Disks (RAID)", IBM Technical Technical Disclosure Bulletin vol. 35 No. 5 (Oct. 1992), pp. 139–141.

Chen et al., "RAID: High-Performance, Reliable Secondary Storage" ACM Computing Surveys, vol. 26 No. 2, (Jun. 1994).

Patterson, Gibson and Katz, "A Case for Redundant Arrays of Inexpensive Disks (RAID)", Proceedings of the ACM SIGMOD Conference, 1988, pp. 109–116.

Menon and Cortney "The Architecture of a Fault-Tolerant Cached RAID Controller", 20th Annual Int'l Symposium on Computer Architecture, May 1993, pp. 76–86.

(List continued on next page.)

*Primary Examiner*—Tod R. Swann
*Assistant Examiner*—Tuan V. Thai
*Attorney, Agent, or Firm*—Esther E. Klein

[57] ABSTRACT

A system and method are provided that is used by software implemented Redundancy Array of Inexpensive Disk (RAID) arrays to achieve adequate performance and reliability, as well as to improve performance or low cost hardware Raids. The enhancements to the basic RAID implementation speeds up recovery time for software RAIDS. A method is provided for storing data in an array of storage devices. A plurality of block locations on the storage devices are logically arranged as a parity group wherein a parity block stored in a block location as part of a parity group is logically derived from the combination of data blocks stored in the parity group, and each block in a parity group is stored on a different storage device. A plurality of parity groups are grouped into a parity group set. A request is received to write a new data block location on a storage device. The old data block stored at the block location is read. The new data block is written to the block location. When the parity set is in an unmodified state prior to the current write, an indicator is written to the storage device that the parity group set is in a modified state. In a preferred embodiment, this enhancement uses a bit map stored on disk, called Parity Group Set, (PGS) bit map, to mark inconsistent parity groups, replacing the Non-Volatile Random Access Memory, (NVRAM) used for similar purposes by hardware RAIDs. Further enhancements optimized sequential input/output, (I/O) data stream.

19 Claims, 7 Drawing Sheets

U.S. PATENT DOCUMENTS

| | | | |
|---|---|---|---|
| 5,301,297 | 4/1994 | Menon et al. | 395/441 |
| 5,301,310 | 4/1994 | Isman et al. | 395/575 |
| 5,333,305 | 7/1994 | Neufeld | 395/575 |
| 5,341,381 | 8/1994 | Fuller | 371/10.1 |
| 5,375,128 | 12/1994 | Menon et al. | 371/40.1 |
| 5,390,327 | 2/1995 | Labbers et al. | 395/182.05 |
| 5,398,253 | 3/1995 | Gordon | 371/40.4 |
| 5,402,428 | 5/1995 | Kakata et al. | 395/441 |
| 5,416,915 | 5/1995 | Maltson et al. | 395/441 |
| 5,418,921 | 5/1995 | Cortney et al. | 395/441 |
| 5,418,925 | 5/1995 | DeMoss et al. | 395/441 |

OTHER PUBLICATIONS

Stodolsky, Gibson and Holland, "Parity Logging Overcoming the Small Write Problem in Redundant Disk Arrays", 20th Int'l Symposium on Computer Architecture, May 1993, pp. 64–75.

Katz and Lee, "The Performance of Parity Placements in Disk Arrays", IEEE Transactions on Computers, vol. 42, No. 6, Jun. 1993.

Menon et al., "Floating Parity and Data Disk Arays", Journal of Parallel and Distributed Computing 17, 1993, pp. 129=14 139.

Menon, "Performance of RAID5 Disk Arrays with Read and Write Caching", Distributed and Parallel database, vol. 2, No. 3, pp. 261–294.

SYSTEM AND METHOD FOR IDENTIFYING INCONSISTENT PARITY IN AN ARRAY OF STORAGE

FIELD OF THE INVENTION

This invention relates to data storage systems and more particularly relates to a system and method for storing data in a software or low cost hardware implemented storage array system.

BACKGROUND OF THE INVENTION

A Redundant Array of Independent Disks (RAID) is a set of disk drives which can regenerate user data when a drive fails by using redundant data stored on the drives. There are five levels of RAID commonly recognized as described by Patterson, D., Gibson, G. and Katz, R. H., Reliable Arrays of Inexpensive Disks (RAID), June 1988, ACM SIGMOD Conference 1988, pp. 109–116. The RAID Level 5 disk array uses a parity technique to achieve high reliability and availability. A parity block protects the data blocks within its parity group. The parity block is the result of exclusive OR (XOR) operations of the data blocks in its parity group. Each block in a parity group is stored on a different disk drive of the array. In RAID 5, the parity blocks are stored on all the disks (with data blocks from other parity groups).

A RAID 5 disk array is robust against single disk crashes. If a disk fails, data on the disk can be recreated by reading data from the remaining disks in the array and performing the appropriate exclusive OR operations.

Whenever a request is made to update a data block, the corresponding parity block must also be updated to maintain consistency. Since the parity must be altered each time the data is modified, RAIDs require four disk accesses to update a data block: (1) Read the old data; (2) Read the old parity; (3) Write the new data; and (4) Write the new parity. The need for four disk accesses per update is often referred to as the RAID-5 update penalty. Following the required four disk accesses, the completion of the update is presented to the host system.

RAID is typically implemented in disk controllers having specialized hardware. XOR hardware performs the XOR operation to compute parity. Non-Volatile RAM (NVRAM) also referred to as a cache improves RAID performance and reliability. These RAID implementations are referred to as hardware RAIDs. Some low cost hardware RAIDs do not have an NVRAM or have a small NVRAM. A software RAID is implemented purely in software running on a host computer. Software RAIDs do not have access to special hardware, so they often need to use specialized algorithms. In particular, software RAIDs do not have access to NVRAM often used by hardware RAIDs to mark inconsistent parity groups and recover from power failures.

More sophisticated hardware RAIDs use NVRAM to improve write performance by implementing write caching (maintaining the write in the cache for easier access by the system) and fast write (considering a write operation to be complete when it is written in the NVRAM). Other hardware RAIDs use NVRAM solely for the purpose of marking inconsistent parity groups (parity groups where the new data has been written but the new parity has not yet been written) and recovering from power failures in the middle of update requests.

An example of a software RAID is the Paragon system from Chantal/BusLogic Corporation or the Corel RAID system from the Corel corporation. Both of these systems are for the Novell Netware servers.

Current software implementations of RAID 5 require a complete scan of all disk blocks following a power failure or a system crash to find and fix inconsistent parity groups. Long recovery times are unacceptable for most practical implementations.

A disk failure during recovery can cause data loss. The data on the broken disk would normally be reconstructed using the data from the other disks. However, if the parity group was inconsistent the data can not be accurately reconstructed. A related problem with having to scan all parity groups during recovery is that if one of the data blocks in a parity group cannot be read (uncorrectable ECC error on the disk block, for example), there is a data loss situation, since the parity group may be consistent. The more the parity groups that have to be scanned, the more likely a data loss situation will occur. Another secondary problem is that parity groups are locked for too long of a time, since the data and parity are written sequentially and the lock is held until both are written to disk.

In Chen, P. M. et. al., RAID: High-Performance, Reliable Secondary Storage, ACM Computing Surveys, June 1994, vol 26 (2); pp 145–186, a system is proposed where every time a write is made to a parity group, an indicator is written to the disk that the parity group has been modified. Such a write requires six disk accesses: (1) Write indicator that the parity group is modified; (2) Read the old data; (3) Read the old parity; (4) Write the new data; (5) Write the new parity; and (6) Write indicator that parity group is not modified. Chen proposes keeping a fixed-size list of parity sectors that might be inconsistent. This list is maintained on disk and in memory. Chen reduces the number of disk I/Os needed to maintain this list by using a group commit mechanism. This improves throughput at the expense of increased response time.

In general, previous software RAID proposals have not included discussion of concurrency and locking issues related to RAIDs. To the extent such discussion has existed, the assumption has been that locking is used to prevent more than one update concurrently executing against a parity group. It is also desirable to optimize concurrent processing of multiple updates against a parity group.

SUMMARY OF THE INVENTION

It is an object of this invention to provide a system that can be used by software RAID-5 arrays to achieve adequate performance and reliability, as well as to improve performance of low cost hardware RAIDs.

It is an object of the invention to provide an enhancement to the basic RAID algorithm which speeds up recovery time for software RAIDs. In a preferred embodiment, this enhancement uses a bit map stored on disk, called a PGS bit map, to mark inconsistent parity groups, replacing the NVRAM used for similar purposes by hardware RAIDs. A further enhancement is provided to optimize sequential I/O data stream. These optimizations may be used by software RAIDs or hardware RAIDs. Among hardware RAIDs, these systems and methods are particularly applicable to RAIDs that do not employ an NVRAM for fast write operations.

A method is provided for storing data in an array of storage devices. A plurality of block locations on the storage devices are logically arranged as a parity group wherein a parity block stored in a block location as part of a parity group is logically derived from the combination of data blocks stored in the parity group, and each block in a parity group is stored on a different storage device. A plurality of parity groups are grouped into a parity group set. A request is received to write a new data block to a block location on a storage device. The old data block stored at the block location is read. The new data block is written to the block location. When the parity group set is in an unmodified state prior to the current write, an indicator is written to the storage device that the parity group set is in a modified state.

In one embodiment, a change parity is calculated for the parity group from the old data block and the new data block. The old parity block for the parity group to which the block location belongs is read. A new parity block is calculated from the change parity and the old parity. The new parity is written to the location on the storage device of the old parity block. After writing the new parity, for each parity group set in an unmodified state, an indicator that the parity group set is in an unmodified state is written to the disk.

In a preferred embodiment, each parity group set is represented in a bit map having a bit set when the parity group set is in a modified state. Each parity group set has a set counter of the number of writes operations currently modifying a parity group set and when a set counter becomes zero, the bit for the parity group set is changed.

The system recovers from a failure by first identifying modified parity group sets. For each parity group in a modified parity group set, any parity groups having an inconsistent parity block is updated based on the data blocks of the parity group.

In a further preferred embodiment, specifically for handling sequential data streams, a determination is made whether a new data block is in a sequential data stream. A change parity for the parity group is calculated from the old data block and the new data block. Processing of the sequential data stream continues until a new data block to be written is not in the preceding sequential data stream. Then, the old parity block is read for each parity group to which a block location that is part of the sequential data stream belongs. A new parity block is calculated for each of these parity groups based on the change parity for the parity group and the old parity block for the parity group. The new parity block for each of these parity groups is written to a location on the storage device of the old parity block for the parity group. The indicator that a parity group set is in a modified state is set when a new data block crosses a boundary into a new parity group set. After writing the new data, for each parity group set in an unmodified state, an indicator is written that the parity group set is in an unmodified state.

In a preferred embodiment, the block location for the new data is locked before the old data is read. The block location is un-locked after the new data is written. The block location of the old parity block is locked before the old parity is read and unlocked after the new parity is written.

In a preferred embodiment a storage array system is provided. The storage array comprises a plurality of storage device, wherein each storage device comprises a plurality of block locations. A plurality of parity groups is logically organized from a plurality of block locations on the storage devices, the parity groups comprise a parity block stored in a parity group block location, where the parity block is logically derived from the combination of data blocks stored in the parity group and where each block in a parity group is stored on a different storage device. A plurality of parity group sets are organized each from a plurality of parity groups. Means are provided for writing a new data block to a block location on a storage device, and reading an old data block stored at the block location. Means are provided for writing to a storage device, an indicator that a parity group set is in an unmodified state. Means are provided for reading an old parity block for a parity group, calculating new parity for a parity group from the old data block, the old parity block and the new data block and writing the new parity to the location on the storage device of the old parity block. Means are also provided for writing to the storage device an indicator that the parity group set is in an unmodified state.

DETAILED DESCRIPTION OF THE INVENTION

Figure 1:
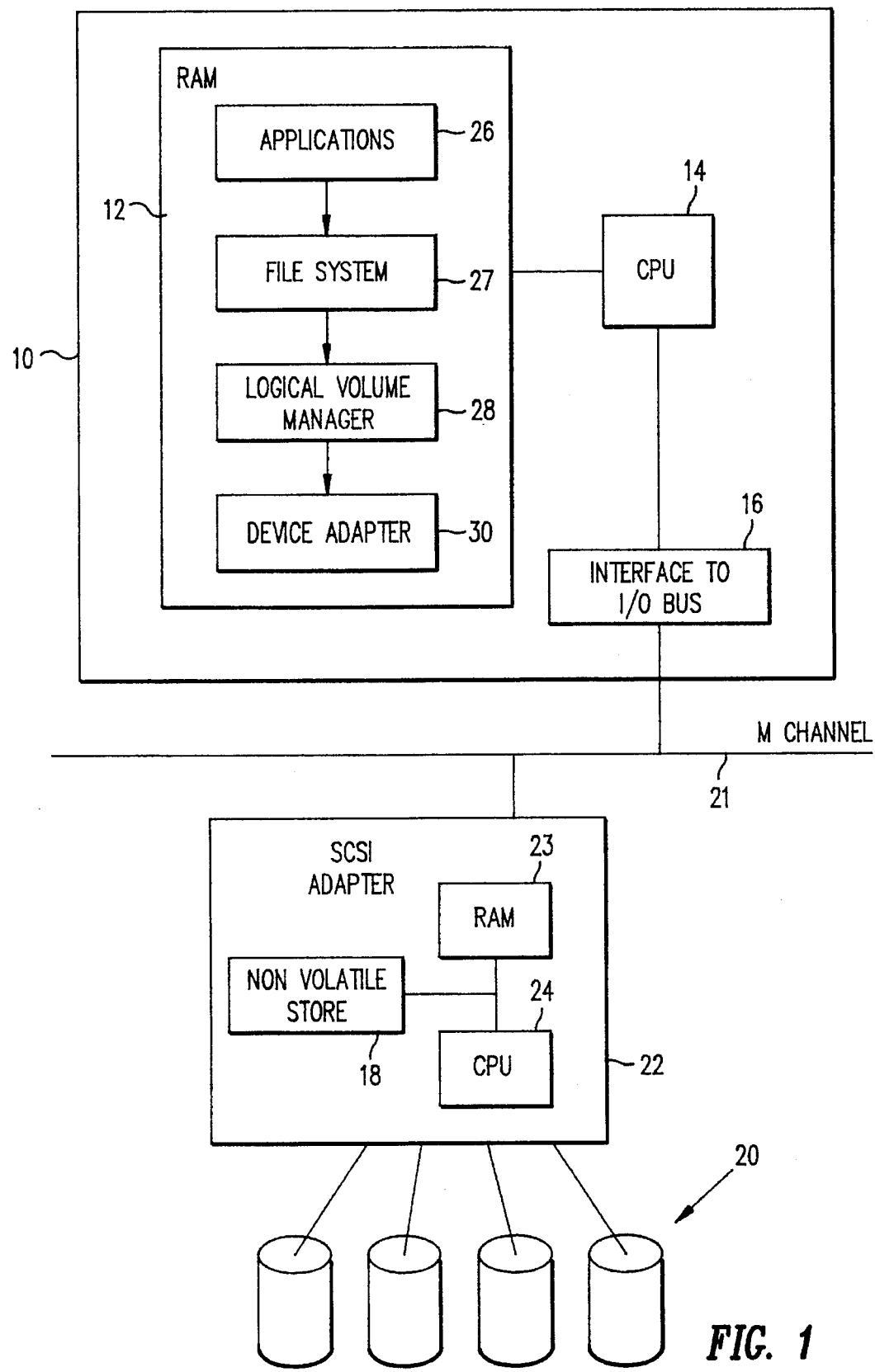
FIG. 1 is a schematic diagram of a storage array system.

Referring to FIG. 1, a software implemented RAID system has a host computer 10 having a random access memory (RAM) 12 connected to a central processing unit (CPU) 14 and an interface to an I/O bus 16. The host system is in communication with an array of disk drives 20 through a micro channel or other communication link 21. The disk drives 20 are controlled by a SCSI adapter 22 comprising a RAM 23 and a CPU 24. The adaptor may also include a non-volatile cache (called an NVRAM or a nonvolatile store NVS) 18.

In a software implemented RAID, the RAID functions are not controlled by the disk adapter or a separate controller, but, by the host system 10 using software loaded into the RAM 12.

An application program running on the host system 26 issues requests to read and write data stored on the drives 20. The data is located using a file system 27 and a logical volume manager 28 through the device adapter 30. Software RAIDs are typically implemented below the file system, either as an operating system device driver or in the logical volume manager (LVM) of an operating system.

Figure 2:
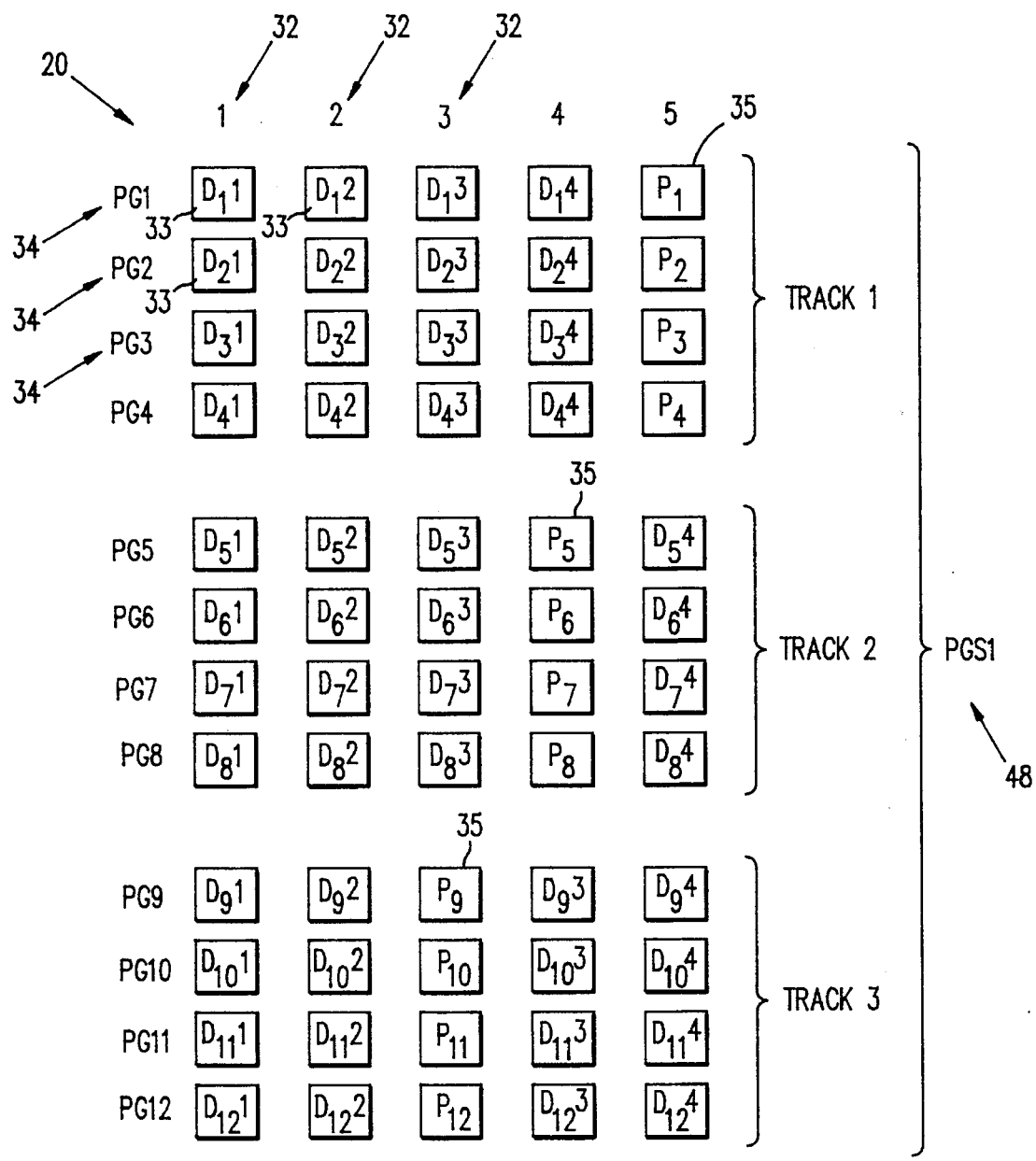
FIG. 2 is a schematic diagram of parity group sets in a storage array system.

Referring to FIG. 2, a set of five disk drives 20 labeled 1 through 5 is organized as a 4+P array. Each vertical column 32 of numbers represents a disk drive. Each reference number 33 represents data blocks and each horizontal row 34 represents a parity group. The number of consecutive data blocks stored on a disk, before the next group of consecutive blocks are stored on a second disk can vary. Each set of X consecutive blocks constitute a stripe unit. A parity stripe unit is a consecutive set of X parity blocks from a disk, such as P1 and P2 for X=2. A stripe consists of N corresponding stripe units from the N disks. X consecutive parity groups constitute a stripe. In typical implementations, a stripe unit will consist of some multiple of 8 blocks. Therefore, a stripe consists of some multiple of 8 parity groups.

As shown in FIG. 2, the location of the parity block 35 is rotated among the disk drives on a track basis.

The Data First Method

When a host issues a request to write (update) block B on disk I, changing its value from D to D' where, for example, the parity for block B on disk I is block B on disk J, and the old parity value is P which needs to be changed to P', the following steps are performed (referred to as the data first method) to satisfy the write request:

(1) Lock the parity group consisting of block B on all disks in array.

(2) In parallel, issue a request to read block B from disk I (old data) and block B from disk J (old parity).

Many disk implementations will allow this write to be chained to and issued at the same time as the previous read for block B disk I.

(3) Queue a request to write D' to block B on disk I as soon as possible, so it can occur in the next revolution of the disk after the read of block B on disk I.

(4) Return "done" to system as soon as possible after D' written safely to disk.

(5) Compute P by performing an XOR operation on D' with D and P, in an order determined by whether D or P first became available.

(6) Write P' as the to disk J block B. This step must not be initiated until after D' has been written safely to disk I block B.

(7) Unlock parity group.

Power may fail at any time during these steps. On recovery from power failure, all parity groups need to be scanned to ensure parity consistency. The following procedure is performed to determine parity group consistency: (1) For each parity group, all data blocks are XORed to produce an expected parity, which is compared with the parity block. (2) If parity is inconsistent (expected parity is not equal to the actual parity block) the parity is made consistent by writing the previously computed expected parity to the parity block on disk.

A faster alternative is to simply always write the computed parity to the parity block on disk, without even checking it first. This works because, during normal operation, data is always written first and then parity. If power failed before data is written, then parity will be consistent. If power failed after data is written, but before parity is successfully written, then making parity consistent during recovery will be appropriate. If power failed in the middle of writing data, the data field may contain garbage. However, since completion of the write request was never conveyed to the host, the host software can recover this data. This is a problem that also occurs with standard (non-Raid) disks.

The long recovery time can be reduced if the user did an orderly "shutdown" prior to turning power off to the machines. During the shutdown, the software RAID completes any ongoing updates, makes all parity groups consistent, and writes a "consistent" flag to disk. On recovery, the RAID software reads the consistent flag from a known location on disk. If the flag is set, it turns off the flag on disk, but knows that no recovery is needed. If the flag is reset, it proceeds to do the lengthy recovery as described previously. This means that lengthy recovery is only initiated for a system crash or a power failure.

The Parallel Method

An alternative to the data first write method is the parallel write method which allows the writing of data and parity to proceed in parallel so that locks are held for a shorter period of time. This parallelism is achieved by affixing time stamps to disk blocks. A field added at the beginning of a block and the same field repeated at the end of the block detect partial writes of blocks caused by power failures during the middle of a write. A partial write of a block is detected if the fields are not identical; otherwise, the block is self-verifying.

During recovery, time stamps provide a way to pinpoint the inconsistent block of an inconsistent parity group. For example, if the parity block indicates a later time stamp for disk 2, than the time stamp in the corresponding data block on disk 1, the data block on disk 1 is backlevel and needs to be made up-to-date. The use of time stamps permits a more aggressive update algorithm, where data and parity are written in parallel.

Preferably, a 2 bit time stamp is used, where the time stamp is actually a counter that increments (through 0) each time a new write occurs.

The following steps are performed to satisfy a host write request:

(1) Lock the parity group consisting of block B from all disks in the array to prevent later host writes to the same parity group.

(2) In parallel, issue a request to read block B from disk I (old data) and block B from disk J (old parity).

(3) XOR D' with D and P (in an order determined by whether D or P first became available) to produce P'.

(4) Queue a request to write D' to block B on disk I as soon as possible, so it can occur in next revolution of disk after read of block B on disk I. This can happen before the previous step completes. The time stamp that goes with D' is obtained by incrementing the time stamp that went with D. The write for D' can not be chained and issued at the same time as the read for D.

(5) Queue a request to write P' (as soon as it is produced) on block B disk J. P' can be written in parallel with the writing of D'. The time stamp that goes with P' is produced by incrementing the appropriate one of the several time stamps associated with P.

(6) Return "done" to system right after the earlier of D' or P' is written safely to disk.

(7) Unlock parity group after later of D' or P' written safely to disk.

Power may fail (or the system may crash) at any time during these steps. On recovery, all parity groups are scanned to check that parity is consistent. If parity is inconsistent, the parity is made consistent as follows:

(1) First, ensure that all blocks are self-verifying. If they are, then find the data block whose time stamp is different from the corresponding time stamp in the parity block, and fix the data block or the parity block, whichever has the earlier time stamp. (2) If only one block is not self-verifying (either data block or parity block), then it is calculated using the other members of the parity group. (3) If two blocks (one data block and the parity block) are both not self-verifying (when the power failure happened at a time when both the data block and the parity block were partially written so that both data and parity are garbage) an arbitrary time stamp for the garbage data field is used and the blocks are made self-verifying. This self-verifying data block and the remaining data blocks are used to produce a consistent parity block. The fact that one data block still contains garbage, is not a problem since there was never a completion of the write request to the host. The host software can recover this data.

Unit of Locking

A typical update might modify 4K bytes (8 sectors), so it might require locking 8 parity groups. To speed up locking, at the expense of update concurrency, larger units can be locked.

Type of Locks

Read requests also need to get locks when a read request to a data block that is in the process of getting updated by an earlier update request must return the updated value of the data block. In this case, read requests would get a shared lock. Many shared locks can be held against a particular parity group, stripe, or whatever lock unit is considered appropriate; this allows many reads to be performed concurrently against a lock unit. Update requests, on the other hand, get exclusive locks so other update or read requests can not be performed concurrently.

Implementing Locks as Queues

Queues are used for requests waiting for locks. For example, two concurrent updates to the same block(s), or a concurrent read and update to the same block(s), may need to be executed in the order these requests were received. This is typically accomplished with a queue (lock) header and a queue of waiting requests (per lock unit). The most convenient way to organize and locate the queue headers is with a hash table. A queue header (and queue) should take up memory only if there is an outstanding request against the corresponding parity group or stripe (or if there was a request in the recent past).

More than one request in a queue can be operational. For example, if all requests in a queue are read requests, they may all be executed. However, once an update request begins execution, other requests in the queue must wait their turn.

Enhancements for Improved Concurrency

An alternative to using a parity group lock which prevents multiple concurrent updates to data blocks in the same parity group, is to allow multiple concurrent updates to blocks in a parity group for the data first algorithm. The read and write of data and the read and write of parity are treated as atomic operations which cannot be interrupted by any other disk I/O to the same block. Host reads to the data block can also occur between the reading and writing of data.

Figure 3:
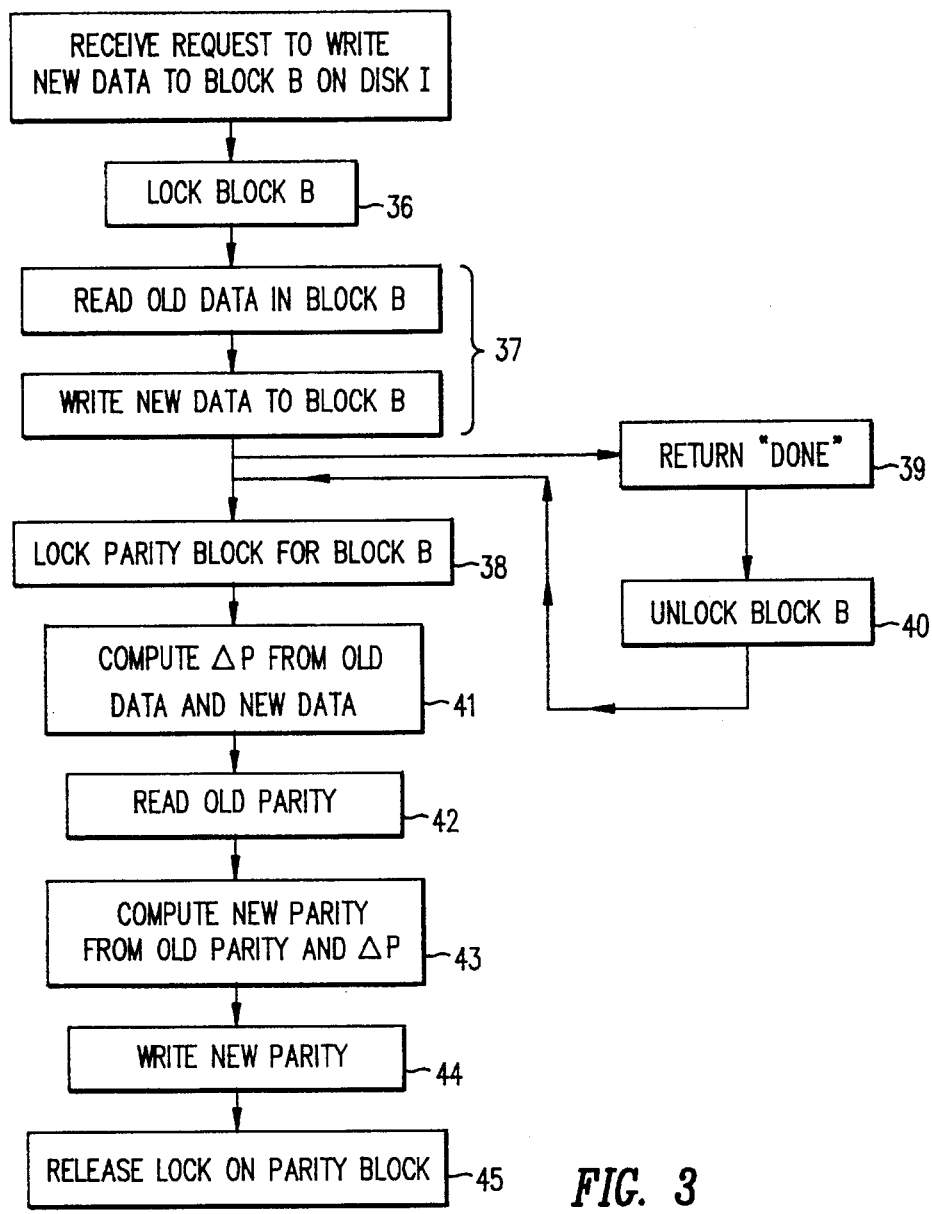
FIG. 3 is a flowchart of a process for writing data to a storage array system.

As shown in FIG. 3, a lock is placed on individual blocks. First a lock is acquired on data and then on parity in that order. Operations are initiated on the data and parity disks only after the lock on the data and parity is acquired respectively. The data and parity locks are released after completing the writing of the new data and new parity to disk respectively.

The concurrency enhanced data first method implements the following steps:

(1) Acquire lock on data (block B of disk I) 36. Wait if needed.

(2) Issue an atomic pair of requests to read D from block B on disk I (old data) and to write D' to block B disk I (new data) 37. This request can be interrupted by requests to other blocks on the same disk, and by host reads for this block.

(3) Acquire lock on parity (block B of disk J) 38. Wait if needed. This lock should be acquired only after a lock on data has been acquired.

(4) Return done to system as soon as possible after D' written safely to disk 39. This can happen before a lock on parity is acquired.

(5) Release lock on data as soon as D' written to disk 40. This can happen before lock on parity is acquired.

(6) XOR D' with D to produce Delta P 41. This can happen as soon as D is read from disk.

(7) Issue a request to read block B from disk J (old parity) 42. This can happen any time after lock on parity is acquired.

(8) Compute new parity P' as old parity XOR Delta P 43.

(9) Issue a request to write P' to block B of disk J 44. This request MUST be the next request for block B after the read of old parity (the lock on parity ensures this).

(10) Release the lock on parity 45.

Another alternative that is a simpler, but more restrictive, way to achieve enhanced concurrency is to treat the read and write of data and of parity as atomic operations which cannot be interrupted by any other disk I/O. This may slow down the response time for some host reads, but it is simpler to implement, since it requires no locking.

Another alternative to locking individual blocks, is to lock stripe units. This reduces locking overhead, since a typical update request would only require one lock on a data stripe unit and one lock on a parity stripe unit (instead of eight locks on data blocks and eight locks on parity blocks), but comes at the expense of reduced concurrency.

The foregoing parallel method may also be enhanced to allow multiple concurrent updates by ensuring that if there are N update requests to a particular block, the order in which the N reads and writes of data are processed is the same as the order in which the N reads and writes of parity are processed.

The following steps implement locking at a block level for multiple concurrent updates using the parallel method:

(1) Acquire a lock on data, then a lock on parity in that order.

(2) Initiate operations on the data disk only after the lock on data is acquired.

(3) Initiate operations on the parity disk only after the lock on parity is acquired.

(4) Don't release any locks until both locks are acquired.

(5) Release the data lock after the writing of the new data to disk is complete.

Release the parity lock after the writing of the new parity to disk is complete. This differs from the scheme for the data first algorithm only in that locks cannot be released until both locks have been acquired.

Stripe unit locking, may be used with a trade off between concurrency and reduced lock overhead.

Another alternative to achieve enhanced concurrency for the parallel algorithm is to initiate or queue up both the data and parity operations for an update request at the respective disks before starting to handle another update request.

The concurrency enhanced parallel method without locking is described below:

(1) Issue an atomic request to read block B from disk I (old data) and to write D' to block B disk I (new data).

(2) As soon as old data is available, XOR D' with D to produce Delta P.

(3) As soon as old data is available, issue a request to read block B from disk J (old parity).

(4) Do not allow another host update request until after completing steps 1–3.

(5) Compute new parity P' as old parity XOR Delta P. Issue a request to write P' to block B of disk J. This request must be the next one executed after the read of old parity.

(6) Issue "done" to requestor as soon as either D' or P' are written to disk.

Parity Group Sets

Software RAIDs that do not have an NVRAM for marking parity groups that are in the process of being modified where either the data or parity is updated, but not both, (in an inconsistent state). Further writes are required to be made to the disks to protect the integrity of the parity groups in the event of a system failure. In the event of a system failure, all parity groups that were being modified need to be brought into a consistent state (as described previously). A preferred embodiment of the invention, as shown in FIG. 2, provides for aggregating a plurality of parity groups 34 to form a Parity Group Set (PGS) 48.

A PGS is used as an aggregation unit for identifying parity groups that may be in the process of being updated. Only parity groups in a PGS which an indicator identifies as being a PGS which may contain a parity group that may be in the process of being updated, need to be modified to be brought into a consistent state. A PGS is preferably a stripe or larger. For example, an array having 30,000 parity groups, 300 Parity Group Sets (PGSes) can be formed where each PGS comprises 100 parity groups. The first 100 parity groups would be in the first PGS, the second 100 parity groups would be in the second PGS, and so on.

Figure 4:
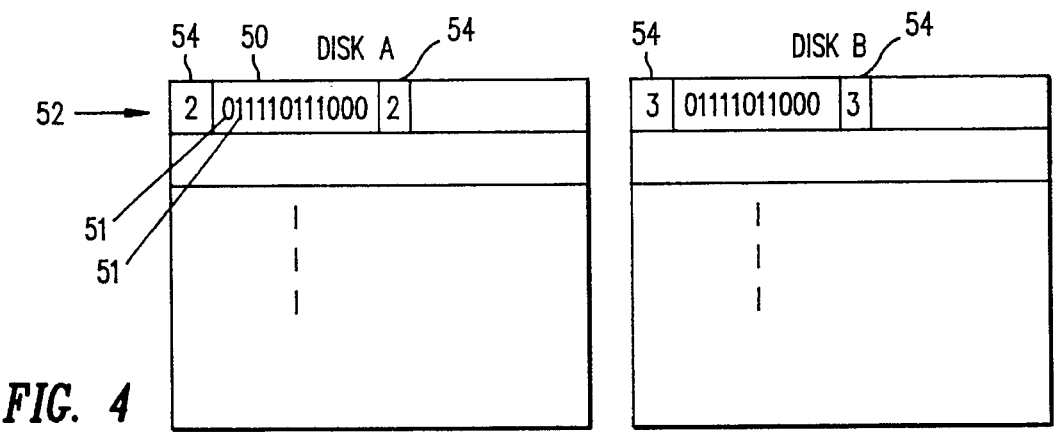
FIG. 4 is a diagram of a parity group set bit map representation stored on storage devices.

Referring to FIG. 4, a bit map 50 is used where each bit 51 represents a PGS. The bit for a PGS is set if any parity group in the PGS may be inconsistent. The bit map is maintained in memory and on disk where the disk version tracks the memory version closely, but the two are not identical at all times. Whenever a parity group is inconsistent, the disk version of the bit map will have its bit set. On a power failure, only the PGSes whose bits are set in the disk PGS bit map need to be scanned.

Preferably the PGS bit map 50 fits in a single disk block 52. Two copies of the PGS bit map 50 are stored on a disk and are written to alternately. This avoids problems caused by power failures in the middle of writing the PGS bit map block. To determine the latest copy and detect partial writes of PGS blocks, a time stamp 54 is stored in the first and last byte of the PGS bit map blocks. A partial write is detected if the time stamp in the first byte is not the same as the time stamp in the last byte. On recovery following power failure, both PGS blocks are read to determine the version with the latest time stamp if both PGS blocks are self-verifying. If one of the PGS disk blocks was only partially written and consequently is not self-verifying, the other PGS block is used for recovery. The two PGS disk blocks are stored at known fixed locations in the array (for example, block 0 and block 1 of first disk of the array). If the disk holding the PGS bit map fails, another disk is selected to hold the PGS bit map. Following a power failure, the disk with the bit map is found using mechanisms similar to the ones used to find other configuration information such as which disks belong to which arrays, etc.

Additionally, for each PGS, a count is maintained of the number of concurrent updates in progress against that PGS.

A process is used to improve the recovery performance of write operations using either the data first or the parallel algorithm in conjunction with the parity group sets bit map. The process uses a global lock on the PGS bit map before checking or changing the bit map and/or the PGS count. It also uses three global flags, a Force flag, a Write in Progress Flag and a Changed Flag. The first flag, if set, indicates that the PGS bit map must be immediately forced to disk. This flag is turned on whenever a bit in the PGS bit map is set. The second flag, if set, indicates that the bit map is being written to disk. The third flag, if set, indicates that the bit map has changed since the last write, but does not require that the change be written to disk immediately. This is the case when one or more bits in the PGS bit map have been reset, but none have been set, since the last write of the bit map.

Figure 5:
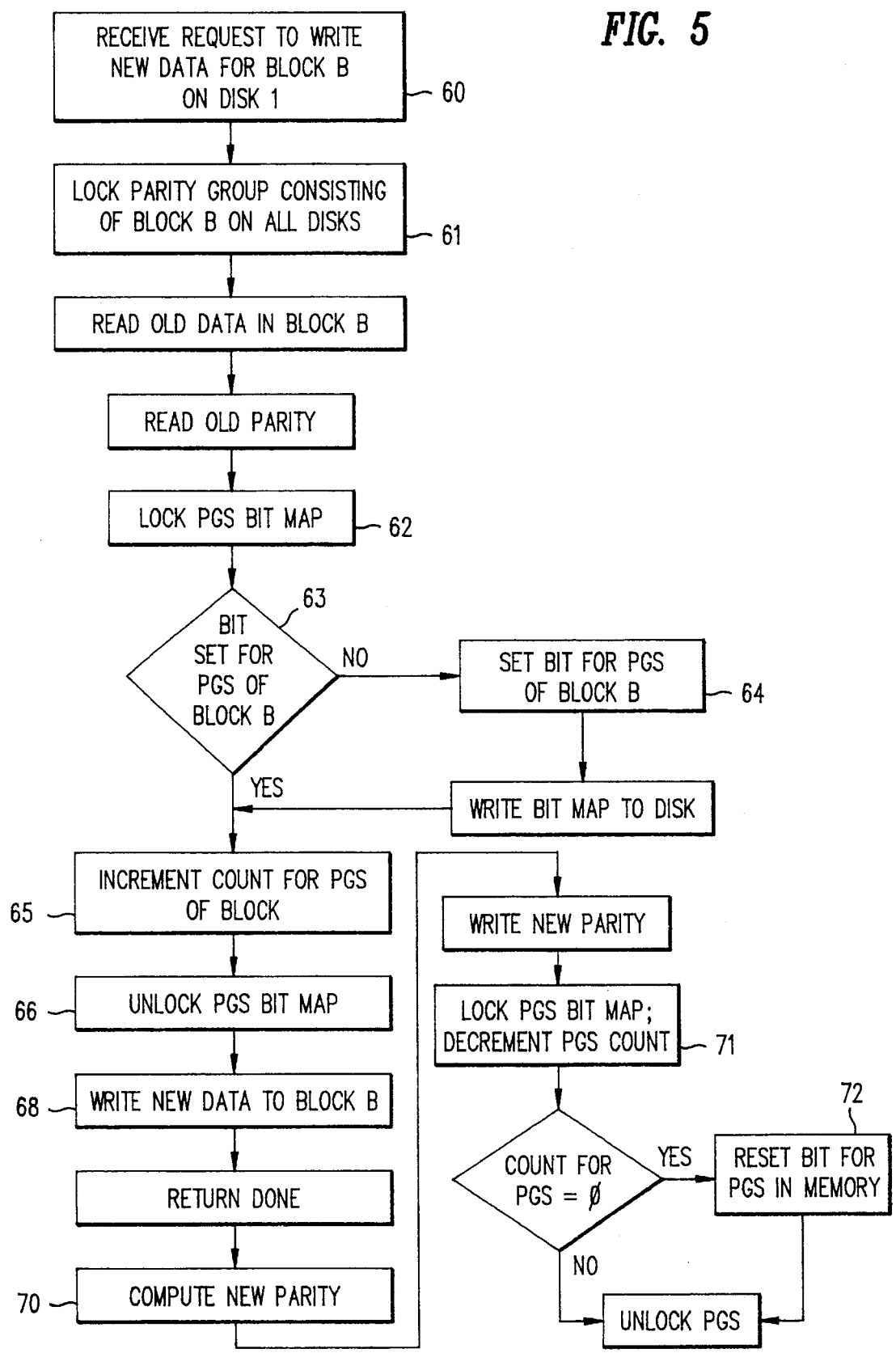
FIG. 5 is flow chart of a process for writing data to a storage array system having data blocks organized into parity group sets.

The process for writing data will be described with reference to the flow chart 60 in FIG. 5.

First, follow the steps outlined for the data first or parallel methods until data or parity are to be written to disk 61. At any time after acquiring the parity group lock but before initiating the write of either the data or the parity, acquire a lock on the PGS bit map 62. Next, check the PGS bit map to see if the bit for this PGS is set 63. If already set, go to next step. If not set, set the bit in the bit map for this PGS 64 and set the Force Flag. If the Write in Progress flag is not set, set this flag which will awaken the PGS bit map writing process. If the Write in Progress flag is already set, the PGS bit map writing process is currently writing a previous change to the bit map; it will automatically initiate the write request containing the new change to the bit map when the old write completes (see below for details). Next, the PGS Count for the appropriate PGS is incremented 65. Afterwards, the PGS bit map is unlocked 66.

If the bit was not already set in PGS bit map, wait until the PGS bit map writing process reports that the PGS bit map with the bit set has been written to disk before continuing with rest of write operation 68.

Following the update of the parity group 70, the PGS bit map is locked and the PGS count decremented for appropriate PGSes 71. If count=0 72, the appropriate bit in PGS bit map is reset. The Changed Flag is set and the PGS bit map is unlocked.

The bit map writing process works as follows:

(1) Wait for Write in Progress Flag to be set.

(2) Lock PGS bit map. Check Force Flag. If not set, then reset Write in Progress Flag, unlock PGS bit map, and return. If set, make a separate memory copy of PGS bit map to be written to disk, reset Force and Changed Flags and unlock PGS bit map.

(3) Increment time stamp to be written with PGS bit map, and change address at which to write bit map to point to alternate location.

(4) Write memory copy of PGS bit map to disk.

(5) When complete, notify write complete.

The bit map writing process is also used occasionally, to dump the PGS bit map to disk if the Changed Flag is on, even if the Force Flag is not on. In addition to the four disk I/Os needed per update request, a fifth disk I/O is sometimes used to write the PGS bit map. This fifth disk I/O is needed only if the appropriate bit in the PGS bit map was not already set. That is, the fifth I/O is needed only if the selected PGS did not already have an update in progress to it. The fifth I/O is sometimes not needed even if the appropriate bit in the PGS bit map was not already set. An update to PGS 1, which sets bit 1, and initiates the first write of the PGS bit map results in five disk I/Os. An update to PGS 2 results in bit 2 being set, and will require another write of the PGS bit map. However, since the bit map writing process is busy writing the PGS bit map, this second write is not immediately initiated. When updates to PGSes are all received before the first write of the PGS bit map completes, then the PGS bits are also set in the bit map, and the second disk write of the bit map will combine the bit map writing for all these update requests into one disk I/O. Thus, the one extra disk I/O needed was shared between the subsequent update requests, each of which did not separately need 5 disk I/Os.

If the PGS size is small, recovery time is improved at the expense of extra disk I/Os during normal operation. With a large PGS size, recovery times will be longer, but normal update performance might be improved.

Distributed PGS Bit Maps

Though unlikely, it may be possible that the throughput of the array becomes limited by how fast we can write the PGS bit map. This is because other disk I/Os are distributed across the disks of the array, whereas the PGS bit map writes are all to one disk.

In one alternate embodiment, the PGS bit map is distributed across the disks in the array. For example, for N disks in the array, the bit map associated with the first 1/N PGSes can be stored (with its alternate location) on disk 1, the bit map associated with the second 1/N PGSes can be stored on disk 2, and so on. With this distribution, there are 2 PGS disk blocks per disk in the array, and the PGS bit map writing is unlikely to be a bottleneck.

A preferred alternative (shown in FIG. 4) is to have the entire bit map replicated on all N disks and establish an order for writing the bit map to the disks, such as writing the bit map first to disk 1, then to disk 2, ..., then to disk N, then back to disk 1, and so on. N writes of bit maps to the N disks cannot be in progress concurrently, otherwise a power failure could then potentially destroy all N disk copies of the bit map. N-1 concurrent bit map writes can be allowed. Following a power failure, the most recent bit map can be determined as the one with the most recent self-verifying time stamp. If a disk fails, it must be taken out of the write rotation and this information must be recorded so as to be accessible during bring-up after a power failure. It can be recorded the same way as other array configuration information needed at bring-up is recorded.

Figure 6:
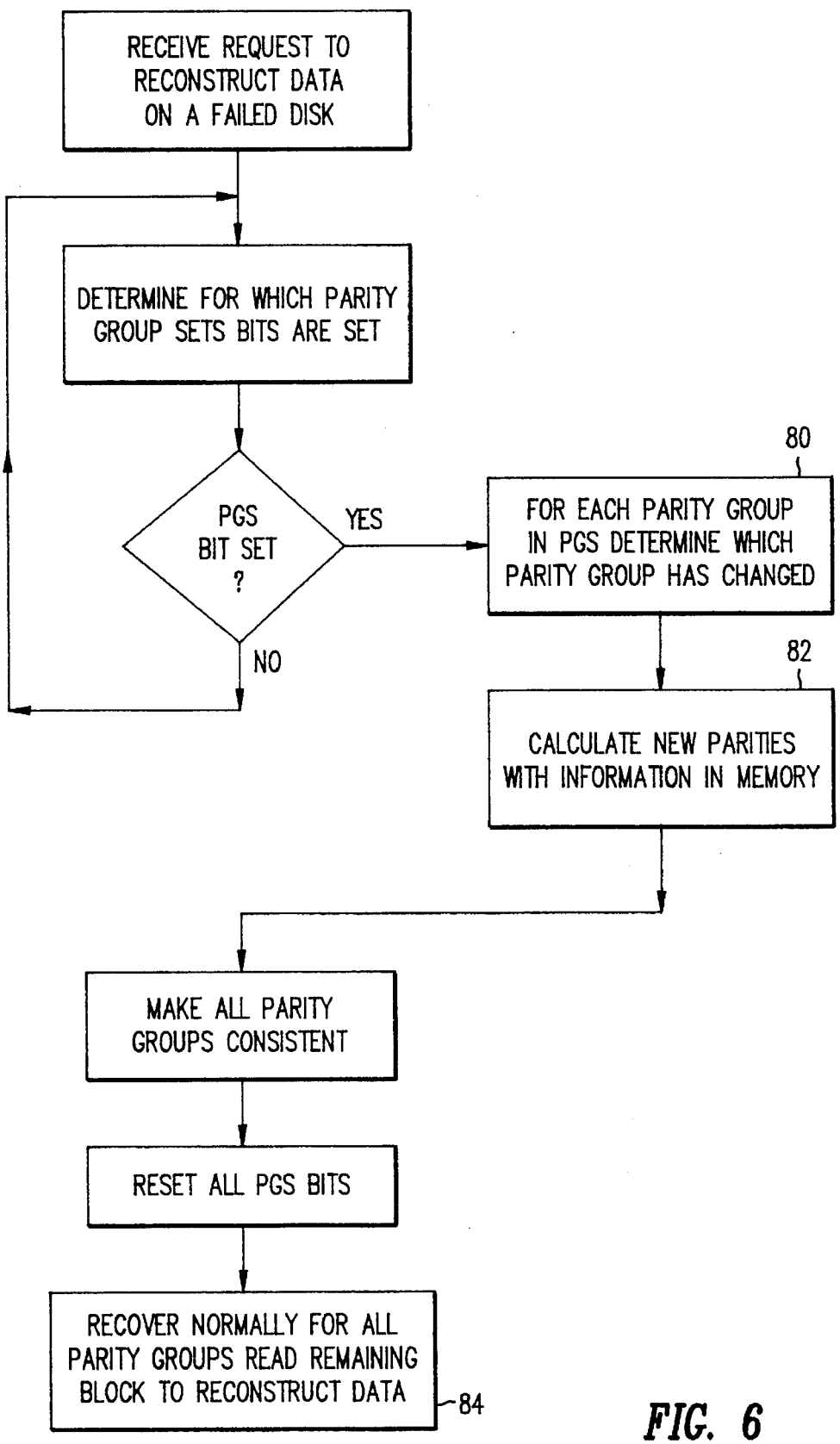
FIG. 6 is a flow chart of a process of recovering from a failure in a storage array system.

The process for recovering from a failure is shown in FIG. 6. For a parity group set with a bit on the bit map set 80, each parity group is scanned to identify any inconsistent parity groups. Inconsistent parity group are made consistent (as described previously) 82 and the failure is corrected under standard RAID 5 recovery procedures 84.

Enhancements for Sequential Workloads

Performance can be improved for workloads that include sequential updates. That is, where the request stream is of the form update block 1, update block 2, ..., update block N. There are a number of ways consecutive data blocks can be striped across the disks. One way is to stripe data blocks in such a way that a stripe is equal to a parity group. Alternatively multiple consecutive data blocks can be stored on one disk, before the next multiple consecutive blocks are stored on a second disk, and so on. That is, a stripe can be multiple parity groups. This is referred to as having a data stripe interleaf depth of N.

Parity Caching Optimization

In one embodiment of the invention, a parity cache is used (when available) to store parity that needs to be written to disk, but has not yet been written. The following steps implement parity caching for write operations described previously in the Data First Method:

(1) Lock the parity group consisting of block B from all disks in the array.

(2) Issue a request to read block B from disk I (old data). Check the parity cache for old parity. If the old parity is not in parity cache, issue a request to read block B from disk J (old parity).

(3) Queue a request to write D' to block B on disk I as soon as possible, so it can occur in next revolution of disk after read of block B on disk I.

(4) Return done to system as soon as possible after D' written safely to disk.

(5) XOR D' with D and P to produce P', in an order determined by whether D or P first became available. The XORing may begin before the previous step is executed.

(6) Save P' in a parity cache. Do not write to disk yet.

(7) Unlock parity group.

Figure 7:
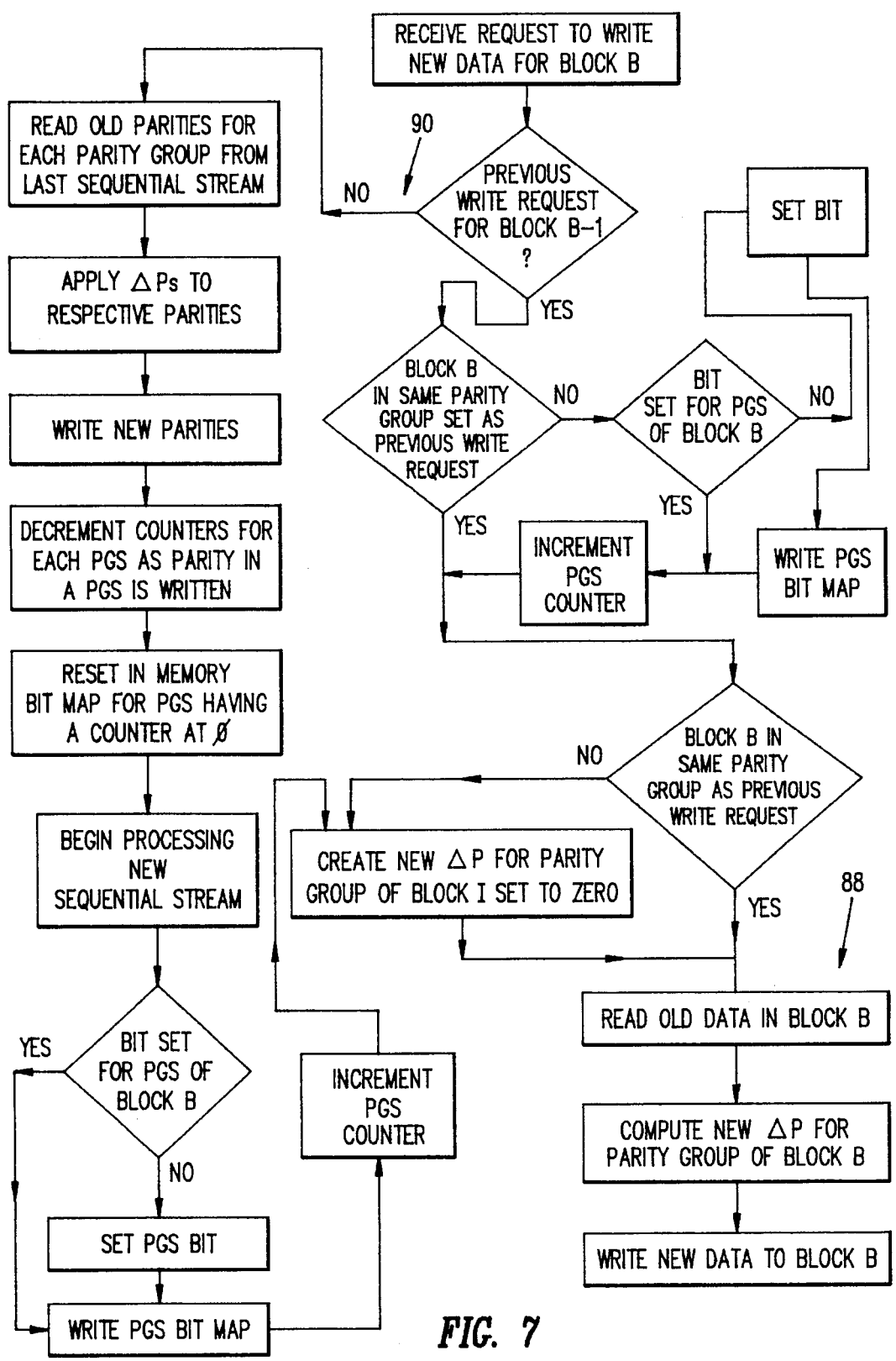
FIG. 7 is a flow chart of a process for writing data to a storage array system organized into parity group sets and having a non-volatile cache.

This process can be applied to either the data first method, or the data first method with the PGS bit map. If the PGS bit map is used (as shown in FIG. 7, at 88), only one disk I/O is needed for writing the PGS bit map if the sequential stream of updates all fall within the same PGS (which is likely). When the PGS bit map is used, the bit in the bit map is not reset until the parity is actually written to disk.

If a disk fails, and the array enters a degraded mode of operation, the parity cache is written to disk, and all subsequent update requests are executed without the parity caching optimization, until rebuild of the failed disk has completed to a spare disk. This minimizes the amount of data that can be lost if there were a power failure or system crash while the array was still in the degraded mode.

Delta Parity Caching Optimization

A further embodiment of the invention is to implement parity caching optimization and delay both the read and the write of parity until the sequential update stream is broken (as shown in FIG. 7 at 90). So, when block 1 is updated, block 1 is read and new data is written, and the XOR of old and new values of block 1 is stored in cache as delta parity. This delta parity must later be applied to parity to compute new parity. When block 2 is updated, block 2 is read and new data written, and a new delta parity is computed (old delta parity XOR old value of block 2 XOR new value of block 2). When the sequential stream is broken, the parity block(s) are read, the delta parity (ies) applied, and the parity block(s) rewritten to the disk.

The bigger the stream of consecutive updates, the bigger the advantage of Delta Parity Caching over Parity Caching. Delta parity caching can also be extended with data prefetching (described below). Parity caching and delta parity caching optimizations can be used by hardware RAIDs, even when the I/O pattern is random. They are most appropriate for low-cost hardware RAIDs which cannot afford to have a large NVRAM for extensive write caching and fast write.

FIG. 6 provides a flow chart of a preferred embodiment for processing sequential write requests for parity groups organized as parity group sets and using the delta parity caching.

Delta Parity and Partial Parity Caching Optimization

A further alternative embodiment of the invention is to save the reading of parity if the entire parity group is updated. This optimization requires that both delta parity and partial parity be cached as follows: (1) When block 1 is updated, read and write block 1. (2) Save in cache the delta parity (new value of block 1 XOR old value of block 1) and the partial parity (new value of block 1). (3) When block 2 is updated, read and write block 2. Also, save in the cache the new delta parity (old delta parity XOR old value of block 2 XOR new value of block 2) and the new partial parity (old partial parity XOR new value of block 2). (4) If an entire parity group is updated, new parity can be computed simply from the partial parity generated in cache. If the entire parity group is not updated, new parity is computed by reading old parity from the disk and applying delta parity to it.

Data Prefetch Optimization

In a further embodiment of the invention, data blocks of a parity group are pre-fetched into the NVRAM when there are sequential updates. When striping the data having an interleaf depth of one, the process works as follows:

(1) When the first block is updated, read and write data block 1, and read parity P1. (2) A new value for P1 is calculated and stored in parity cache, but not written to disk. (3) When the next consecutive block, block 2, is updated, read and write block 2 and compute a new value for P1 in parity cache. At the same time, also prefetch the next consecutive blocks in the parity group, blocks 3 and 4, in anticipation of updates to blocks 3 and 4. (4) When blocks 3 and 4 are updated, writing block 3 to disk completes the update; that is, there is only 1 disk I/O involved in the response time of the update operation. The prefetching of blocks is triggered as soon as 2 out of N blocks in a parity group have been updated, or as soon as N/2 blocks in a parity group have been updated, or any other criterion chosen has been satisfied.

As before, the writing of parity is delayed until the sequential stream of update requests is broken. Some wasted work may be done if the update request stream is broken too soon.

The prefetching described above is different from the prefetching performed automatically by many disk drives, since the prefetching here goes across disk drives.

Caching Enhancements

Caching of data and parity blocks may be employed to reduce disk I/Os, even when updates are random. Such general caching is complementary to all methods presented. The following additional points apply when data and parity are cached.

Locks are acquired as before, but the locks on parity can be released as soon as new parity has been updated in cache. There is no need to wait until parity is written to the disk.

After appropriate locks have been acquired, always check in cache for data (parity) first. Cache should return either that (1) data (parity) is in cache; (2) data (parity) is not in cache, but is being fetched from the disk for another request; or (3) data (parity) is not in cache. The request uses the data (parity) from cache, in the first case. The request waits until the I/O completes and then uses data (parity) from cache, in the second case. The request puts a mark in the cache that it is fetching data (parity) from disk, in the third case, so later update requests to the same data or parity group will be appropriately notified.

Data (parity) is pinned in cache for the duration of time it is needed by one or more requests. This prevents it from being replaced by normal LRU replacement policies while being used.

Fully Enhanced Data First With Parity Caching Method

Figure 8:
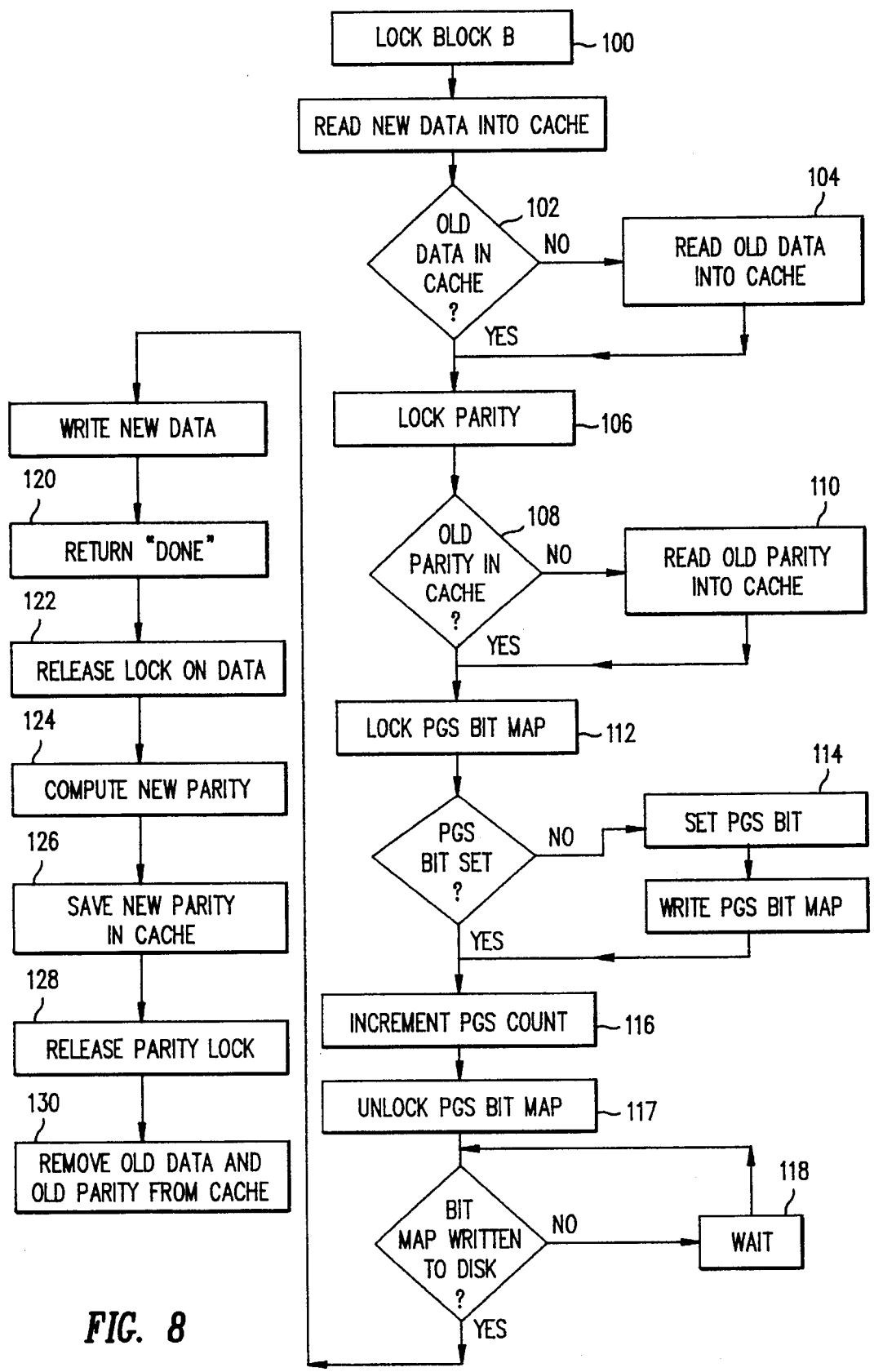
FIG. 8 is a flow chart of a further embodiment of a process for writing data to a storage array system organized into parity group sets and having a non-volatile cache.

The fully enhanced embodiment of the data first algorithm described below for data first writes with enhanced concurrency, enhanced recovery, parity caching and data caching and is described with reference to FIG. 8.

(1) Acquire lock on data (block B disk I) 100. Wait if needed.

(2) Allocate space for D' in cache and bring D' from host into cache.

(3) Check cache for old data 102. If there or being fetched, use cache copy and go to Step 4. If not there and not being fetched, issue a request to read old data D 104.

(4) Acquire lock on parity (block B of disk J) 106 after lock on data has been acquired. Wait if needed. This lock should be acquired only after lock on data has been acquired.

(5) After the parity lock is acquired, check the parity cache for old parity 108. If old parity is not in parity cache, and not being fetched, issue a request to read old parity 110. Otherwise, use cache copy.

(6) Acquire a lock on the PGS bit map 112. This can be attempted before the lock on parity has been acquired.

Check the PGS bit map to see if the bit for this PGS is set. If already set, go to next step. If not set, set the bit in the bit map 114.

(7) Set the Force Flag. If Write in Progress not set, set this flag which will awaken the PGS bit map writing process. If Write in Progress is already set, the PGS bit map writing process is currently writing a previous change to the bit map; it will automatically initiate the write containing the new change to the bit map when the old write completes (see below for details).

(8) Increment PGS Count for appropriate PGS 116. Unlock PGS bit map 117.

(9) If bit was not already set in PGS bit map when checked earlier, wait until PGS bit map writing process reports that the PGS bit map with the bit set in Step 6 has been written to disk 118.

(10) Queue a request to write D' to block B on disk I as soon as possible after D has been read. This can only happen after the PGS bit map was written if needed, but it can happen before the parity lock was acquired.

(11) Return done to system as soon as possible after D' written safely to disk 120. This can happen before lock on parity is acquired.

(12) Release lock on data as soon as D' written to disk and D' is established as new value of block on disk 122. This can happen before lock on parity is acquired.

(13) XOR D' with D and P to produce P' 124, in an order determined by whether D or P first became available. XORing may begin as early as Step 3. It cannot complete until after Steps 3 and 5 have both completed.

(14) Save P' in a parity cache 126. Do not write to disk yet. It will be written by the parity writing process (see below).

(15) Release the lock on parity 128.

(16) Remove D and P from cache 130.

In the above sequence of steps, steps 1, 2, 3, 6, 7, 8, 9, 10 and 11 must be executed in that order. Step 4 can be executed any time after Step 1, and Step 5 after Step 4. Step 12 can begin as soon as data from Step 3 is available or parity from Step 5 is available. Step 12 cannot complete until both data and parity are available. Steps 13, 14 and 15 must sequentially follow Step 12.

The bit map writing process works as follows:

(1) Wait for Write in Progress Flag to be set.

(2) Lock PGS bit map.

(3) Check Force Flag.

(4) If Force Flag not set, then reset Write in Progress Flag, unlock PGS bit map, and return to Step 1. If Force Flag is set, make a separate memory copy of PGS bit map to be written to disk, reset Force and Changed Flags and unlock PGS bit map.

(5) Increment time stamp to be written with PGS bit map, and change address at which to write bit map to point to alternate location.

(6) Write memory copy of PGS bit map (made in Step 3) to disk.

(7) When complete, notify all requestors waiting for write to complete. Go to Step 2.

The parity writing process works as follows:

(1) Write parity to disk when sequential stream of updates is broken, or later.

(2) Make parity the least-recently-used (LRU) block so it will be flushed quickly from cache.

(3) Lock PGS bit map and decrement PGS count for appropriate PGS. If count=0, reset appropriate bit in PGS bit map. Set the Changed Flag and unlock the PGS bit map.

Awaken the bit map writing process occasionally, to dump the PGS bit map to disk if the Changed Flag is set, even if the Force Flag is not set.

During an orderly shutdown, the RAID subsystem forces any cached parity or data to disk until the PGS bit map becomes all zeroes then, the PGS bit map is forced to disk. The recovery time at next power on will be accomplished quickly.

Random Workloads

All of the embodiments can be used even for random workloads (particularly, the fully enhanced delta parity caching approach). There are many advantages of using this invention including improved concurrency, and the opportunity for optimizing I/O for parity, since these can be delayed until more opportune times and I/O combining may be possible.

CONCLUSION

While the invention has been particularly shown and described with reference to the preferred embodiment, it will be understood that various changes of form and detail may be made without departing from the spirit and scope of the invention as defined by the appended claims.

We claim:

1. A method for storing data in an array of storage devices, including processor and memory comprising the steps of:

(A) logically arranging a plurality of block locations on the storage devices as a plurality of parity groups wherein a parity block stored in a block location as part of a parity group is logically derived from the combination of data blocks stored in the block locations of the parity group, and each parity and data block in a parity group is stored on a different storage device;

(B) grouping a set of the plurality of parity groups into a parity group set; and (C) when writing a new data block to a data block location on a storage device:
    (i) reading an old data block stored at the data block location;
    (ii) writing the new data block to the data block location;
    (iii) identifying a parity group and a parity group set to which the block location belongs;
    (iv) only when the identified parity group set is in an unmodified state prior to writing the new data block, writing to the storage device an indicator that the identified parity group set is in a modified state indicating that during a recovery process, all parity groups in the identified parity group set will be checked for inconsistent parity; and (D) using a parity group set counter to track whether the parity group set is in an unmodified state and when there are no longer any write operations currently modifying the parity group set, an indicator is set that the parity group set is in an unmodified state.

2. The method for storing data in an array of storage devices as called for in claim 1, further comprising the steps of:

(D) reading an old parity block for the identified parity group to which the data block location belongs;

(E) calculating a new parity block for the identified parity group from the old data block, the old parity block and the new data block;

(F) writing the new parity block to a location on the storage device for the old parity block;

(G) after completing step (F), indicating that the identified parity group is in an unmodified state;

(H) determining whether all parity groups in the identified parity group set are in an unmodified state;

(I) for each parity group set where all parity groups in the parity group set are in unmodified states, writing in memory an indicator that the parity group set is in an unmodified state; and (J) occasionally writing to a storage device, indicators of which parity group sets are in an unmodified state, wherein, during a recovery process, no parity group in a parity group set having an indicator written to the storage device indicating the parity group set is in an unmodified state will be checked for inconsistent parity.

3. The method for storing data in an array of storage devices as called for in claim 2, further comprising the steps of:

locking the data block location before step (C)(i);

unlocking the data block location after step (C) (ii);

locking a block location of the old parity block before step (D); and unlocking the block location of the old parity block after step (F).

4. The method for storing data in an array of storage devices as called for in claim 1, further comprising the steps of:

(D) calculating a change parity block for the identified parity group from the old data block and the new data block;

(E) reading an old parity block for the identified parity group to which the data block location belongs;

(F) calculating a new parity block from the change parity block and the old parity block; and (G) writing the new parity block to a location on the storage device for the old parity block;

(H) after completing step (G), indicating that the identified parity group is in an unmodified state;

(I) determining whether all parity groups in the identified parity group set are in an unmodified state;

(J) for each parity group set where all parity groups in the parity group set are in unmodified states, writing in memory an indicator that the parity group set is in an unmodified state; and (K) occasionally writing to a storage device, indicators of which parity group sets are in an unmodified state, wherein, during a recovery process, no parity group in a parity group set having an indicator written to the storage device indicating that the parity group set is in an unmodified state will be checked for inconsistent parity.

5. The method for storing data in an array of storage devices as called for in claim 1, wherein each parity group set is represented in a bit map having a bit set when the parity group set is in a modified state and said bit map is stored in memory and on a storage device and wherein the bit is reset when there are no longer any write operations modifying the parity group.

6. A method for recovering from a failure in a storage system using the method for storing data in an array of storage devices as called for in claim 5, comprising the steps of:

(A) retrieving from a storage device the parity group set bit map;

(B) for each parity group set having a bit set, identifying each inconsistent parity group in each said parity group set having a bit set, having an inconsistent parity block; and (C) for each said inconsistent parity group, updating the parity block for the inconsistent parity group based on the data blocks of the inconsistent parity group.

7. A method for recovering from a failure as called for in claim 6 further comprising the steps of:

writing the parity group set bit map in two locations on the storage devices;

writing a time stamp at the beginning and end of the bit map as the bit map is written to the storage devices;

retrieving from the storage devices the most recent consistent time stamped version of the bit map when retrieving the bit map for a recovery process.

8. A method for recovering from a failure in a storage system using the method for storing data in an array of storage devices as called for in claim 1, comprising the steps of:

(A) reading from a storage device, indicators identifying modified parity group sets;

(B) for each modified parity group set, identifying each inconsistent parity group in said modified parity group set having an inconsistent parity block; and (C) for each said inconsistent parity group, updating the parity block for the inconsistent parity group based on the data blocks of the inconsistent parity group.

9. The method for storing data in an array of storage devices as called for in claim 1 further comprising the steps of:

(D) determining whether the new data block is a continuation of a sequential data stream;

(E) calculating a change parity block for the identified parity group from the old data block and the new data block; and (F) when said new data block is not the continuation of said sequential data stream:

(i) reading an old parity block for each parity group to which each block location that is part of the sequential data stream belongs;

(ii) calculating a new parity block for each parity group to which each block location that is part of the sequential data stream belongs based on a change parity block for said each parity group and the old parity block for said each parity group; and (iii) writing the new parity block for each parity group to which each block location that is part of the sequential data stream belongs to a block location for the old parity block of said each parity group.

10. The method for storing data in an array of storage devices as called for in claim 9 wherein the indicator that the identified parity group set is in a modified state is written to the storage device after the new data block is determined to be in a parity group that is in a new parity group set from the parity group set of the previous data block of the data stream.

11. The method for storing data in an array of storage devices as called for in claim 10, further comprising the step of:

(iv) after completing step (F)(iii), for each parity group set in an unmodified state, writing in memory an indicator that the parity group set is in the unmodified state.

12. In a storage array system including plurality of storage devices, each storage device comprising a plurality of block locations, wherein a group of block locations are designated as a parity group, each parity group including a plurality of data blocks and a parity block stored in the parity group block locations, the parity block being logically derived from the combination of data blocks of the parity group, a method for writing a new data block to a designated block location in an array of storage devices without first storing the data blocks and parity block in a cache memory, comprising the ordered steps of:

(A) determining an old parity block corresponding to a parity group of the designated block location;

(B) locking the designated block location;

(C) reading an old data block stored at the designated block location;

(D) writing the new data block to the designated block location;

(E) unlocking the designated block location;

(F) locking a block location of the old parity block for the designated parity group to which the designated block location belongs;

(G) reading the old parity block;

(H) calculating a new parity block for the designated parity group based on the old data block, the old parity block and the new data block;

(I) writing the new parity block to the block location of the old parity block; and (J) unlocking the block location of the old parity block.

13. A storage array system comprising:

a plurality of storage devices, wherein each storage device comprises a plurality of block locations;

a plurality of parity groups logically organized from said plurality of block locations on the storage devices, said parity groups comprising a parity block stored in one of the parity group block locations, said parity block logically derived from a combination of the data blocks stored in the parity group block locations, wherein each data and parity block in a parity group is stored on a different storage device;

a plurality of parity group sets, each parity group set comprising a set of said plurality of parity groups;

means for writing a new data block to one of said parity group block locations on one of said storage devices:

means for reading an old data block stored at said one of said parity group block locations;

means for identifying one of said parity group sets to which said one of said parity group block locations belongs;

means for determining when said one of said parity group sets does not have an indicator that said one of said parity group sets is in an unmodified state; and means for writing to the storage devices, an indicator that said one of said parity group sets is in a modified state.

14. The system of claim 13 further comprising:

means for determining the parity group to which the parity group block location belongs;

means for reading an old parity block for the determined parity group;

means for calculating a new parity block for the determined parity group from the old data block, the old parity block and the new data block;

means for writing the new parity block to a parity group block location on the storage device where the old parity block was stored;

means for determining each parity group set in an unmodified state; and means for writing to the storage device an indicator that at least one of said parity group sets is in an unmodified state.

15. The system of claim 14 wherein said indicator that at least one of said parity group sets is in an unmodified state and a modified state comprises a parity group set bit map having a bit set for each parity group set in said modified state; and a set counter for each parity group set of the number of write operations currently modifying a parity group set wherein when said set counter becomes zero, the bit for the parity group set is changed.

16. The system of claim 13 further comprising:

means for identifying a modified parity group set;

means for identifying any parity groups in said modified parity group set having an inconsistent parity block; and means for updating the parity block for each inconsistent parity group based on the data blocks of the parity group.

17. The system of claim 13 further comprising:

means for determining whether the new data block is a continuation of sequential data stream;

means for calculating a change parity block for a parity group from the old data block and the new data block;

means for reading an old parity block for each parity group to which a block location that is part of the sequential data stream belongs;

means for calculating a new parity block for each parity group to which a block location that is part of the sequential data stream belongs based on the change parity for each parity group and the old parity block for each parity group; and means for writing the new parity block for each parity group to which a block location that is part of the sequential data stream belongs to each block location on the storage device of the old parity block for the parity group.

18. An article of manufacture for use in a computer system for storing data in a computer system having an array of storage devices, the computer system having means to write data blocks to the storage devices, said article of manufacture comprising a computer-readable storage medium having a computer program code embodied in said medium which may cause the computer to:

(A) logically arrange a plurality of block locations on the storage devices as a plurality of parity groups wherein a parity block stored in a block location as part of a parity group is logically derived from the combination of data blocks stored in the block locations of the parity group, and each parity and data block in a parity group is stored on a different storage device;

(B) group a set of the plurality of parity groups into a parity group set; and (C) when writing a new data block to a data block location on a storage device:

(i) read an old data block stored at the data block location;

(ii) write the new data block to the data block location;

(iii) identify a parity group and a parity group set to which the block location belongs;

(iv) only when the identified parity group set is in an unmodified state prior to writing the new data block, write to the storage device an indicator that the identified parity group set is in a modified state so that during a recovery process, all parity groups in the identified parity group set will be checked for inconsistent parity;

(v) incrementing a parity group set counter for the identified parity group set when the identified parity group becomes modified;

(vi) decrementing the parity group set counter for the identified parity group when the identified parity group becomes unmodified; and (vii) when the parity group set counter for the parity group set becomes zero, setting an indicator that the parity group set is in an unmodified state.

19. The new article of manufacture as claimed in claim 18 wherein the computer program code may further cause the computer to:

(D) read an old parity block for the identified parity group to which the data block location belongs;

(E) calculate a new parity block for the identified parity group from the old data block, the old parity block and the new data block;

(F) write the new parity block to a location on the storage device for the old parity block;

(G) after completing step (F), indicate that the identified parity group is in an unmodified state;

(H) determine whether all parity groups in the identified parity group set are in an unmodified state;

(I) for each parity group set where all parity groups in the parity group set are in unmodified states, write in memory an indicator that the parity group set is in an unmodified state; and (J) intermittently write to a storage device, indicators of which parity group sets are in an unmodified state, wherein, during a recovery process, no parity group in a parity group set having an indicator written to the storage device indicating the parity group set is in an unmodified state will be checked for inconsistent parity unmodified state.

* * * * *